United States Patent [19]

Ittershagen et al.

[11] Patent Number: 5,168,831
[45] Date of Patent: Dec. 8, 1992

[54] TACKY-SURFACE ANIMAL REPELLER

[76] Inventors: Stephen J. Ittershagen; Daniel C. Ittershagen, both of 6767 W. Butler, No. 133, Glendale, Ariz. 85301

[21] Appl. No.: 854,869

[22] Filed: Mar. 20, 1992

[51] Int. Cl.$^5$ .............................. A01K 15/00
[52] U.S. Cl. ...................................... 119/29
[58] Field of Search ............ 119/29; 52/101; 43/114, 43/115, 136

[56] References Cited

U.S. PATENT DOCUMENTS

| | | | |
|---|---|---|---|
| 575,019 | 1/1897 | Wightman et al. | 43/136 |
| 3,816,956 | 6/1974 | Sekula | 43/114 |
| 4,425,733 | 1/1984 | Ammon et al. | 43/114 X |
| 4,800,671 | 1/1989 | Olson | 43/108 |
| 4,829,702 | 5/1989 | Silvandersson | 43/114 |
| 4,949,216 | 8/1990 | Djukastein | 361/232 |

FOREIGN PATENT DOCUMENTS 63946 9/1945 Denmark .................. 43/136
2167282 5/1986 United Kingdom ........ 43/114

Primary Examiner—Gene Mancene
Assistant Examiner—Thomas Price
Attorney, Agent, or Firm—Antonio R. Durando; Harry M. Weiss

[57] ABSTRACT

A sheet of flexible transparent material that is coated on both sides with non-permanent adhesives. The coating on one side is designed to adhere to typical coverings, such as tile and carpet, and yet be easily removable at will. The coating on the other side is preferably stronger, designed to stick to the paws of an animal stepping over it and require a forceful and unpleasant effort for the animal to free itself from its grip. After repeated encounters with the device, the animal is trained to stay away from it and from the location associated with it. The sheet of adhesive material can be cut to the desired shape to conform to the particular needs of the area or object selected for protection.

9 Claims, 1 Drawing Sheet

TACKY-SURFACE ANIMAL REPELLER

BACKGROUND OF THE INVENTION

1. Field of the Invention

This invention is related to the general field of animal repellant devices. In particular, the invention provides a method and apparatus for keeping dogs, cats, and other domestic animals outside of a given area where their presence is not desired.

2. Description of the Prior Art

A common problem experienced by pet owners is a simple way to keep their animals away from certain areas, specially in a home or business environment. Some animals, such as dogs and cats, tend to cause damage to fixtures and furniture by scraping, scratching, and eating plants to satisfy their grooming and playing needs. The owners' efforts in training a pet not to enter certain areas of the house or building are usually marked by limited success; and the forceful reclusion of the animal to a specific space, such as a locked room or pen, often results in severe damage to surround articles.

Thus, people normally either allow their pets to roam freely or restrict them by means of chains or similar restraining devices.

This invention is directed at providing a simple means for training a domestic ground animal, such as a dog or a cat, to stay away from certain delineated areas without resorting to such drastic restraining apparatus. The invention is based on the principle that animals find it uncomfortable to have extraneous material stick to their paws and will avoid stepping over anything that they know might become attached to them.

A prior art search revealed some patents that describe the use of adhesive materials and of electrical charge to trap or effect the behavior of insects and other animals. For example, U.S. Pat. No. 3,816,956 to Sekula (1974) illustrates an adhesive tape to catch insects. U.S. Pat. No. 4,800,671 to Olson (1989) discloses an elongated insect trap formed in a recessed area of a strip of flexible material wrapped around the trunk of a tree. Finally, in U.S. Pat. No. 4,949,216 (1990), Djukastein shows an electrified mat that gives a repelling shock to an animal stepping over it.

None of the referenced patents teaches a device that can be used for training a cared-for, pet animal to stay away from predetermined areas or objects without the direct use of physical restraints. Therefore, this invention provides such an apparatus, both as a deterrent to encroachment and as a training tool.

BRIEF SUMMARY OF THE INVENTION

One objective of this invention is the development of simple animal repellant apparatus that works by having an adhesive surface that sticks to the paws of the animal stepping on it, thus giving it an uncomfortable feeling and providing negative feedback for training purposes.

Another goal of the invention is a device that can be placed on the floor around an area or an object desired to be kept off-limits to pet animals.

Another objective of the invention is apparatus that can be tailored to the particular geometry of the area or object chosen for protection.

A further goal is that the apparatus be inconspicuous to the animal, so that its effects continue after a period of training even though the apparatus is no longer used.

Still another objective of the invention is an apparatus that is unobtrusive and does not interfere with the normal use of the premises while the animal is being trained.

A final objective of this invention is the realization of the above mentioned goals in an economical and commercially viable manner. This is done by utilizing components and methods of manufacture that are either already available in the open market or can be developed at competitive prices.

According to these and other objectives, the preferred embodiment of the present invention consists of a sheet of transparent material coated on both sides with non-permanent adhesives. The coating on one side is designed to adhere to typical floor coverings, such as tile and carpet, and yet be easily removable at will. The coating on the other side is preferably stronger, designed to stick to the paws of an animal stepping on it and require a forceful and unpleasant effort for the animal to free itself from its grip. After repeated encounters with the device, the animal is trained to stay away from it and from the location associated with it. The sheet of adhesive material can be cut to the desired shape to conform to the particular needs of the area or object selected for protection.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

The thrust of this invention lies in the recognition that any restraint in the freedom of movement of an animal's legs and feet is a source of great discomfort and irritation that the animal will go to great lengths to avoid. This is particularly true of cats, who are known for their abhorrence of anything affecting their freedom of movement. Therefore, this feature is exploited to create a simple apparatus that can be used to train a pet by negative reinforcement to associate that discomfort with a specific location desired to be kept off-limits. Thus, the apparatus is used not only to achieve immediate deterrent results, but also to condition the animal to avoid future discomfort by staying away from the prohibited area. By manufacturing the apparatus with transparent, almost invisible, material, the animal associates the discomfort more with the place than with the apparatus itself, so that it continues to avoid the area even when the invention is no longer in use.

Figure 1:
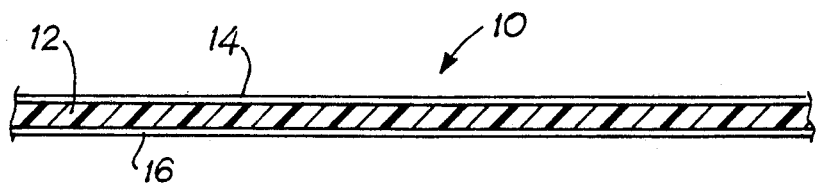
FIG. 1 is a cross-sectional view of a representative portion of the sheet material of the invention.
Figure 2:
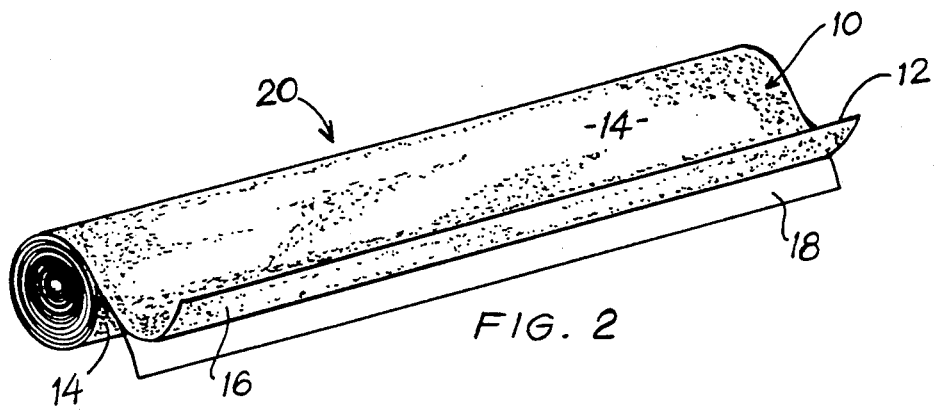
FIG. 2 is a perspective partial view of the preferred embodiment of the invention in roll form.

Referring to the drawings, wherein like parts are identified with like numerals and symbols throughout the specification, FIG. 1 illustrates the way the sheet material 10 of the invention is constructed. Seen in cross-sectional view, the invention consists of a continuous sheet 12 of preferably flexible material covered on both sides with layers 14 and 16 of adhesive substances. The sheet 12 is also preferably transparent in order to permit its inconspicuous use over color floors or on fixtures and furniture; flexible plastic material such a vinyl plastic is ideal as a substrate because of its ability to conform to any surface without the need to use permanently pre-shaped rigid sheets. The layers of adhesive 14 and 16 consist of transparent sticky glue of the type normally referred to as pressure sensitive, such as is found on removable labels and decals. These adhesives are characterized by having a tacky feel at the touch that becomes more sticky when pressure is applied to them; they can then be peeled off and reused without leaving a residue on the surface to which they adhered. As a result, these adhesives can be handled easily and provide an ideal material to implement the concept of this invention.

In the preferred embodiment, the top layer 14 consists of stronger adhesive than the bottom layer 16. Because its effectiveness is measured by the degree to which the layer will stick to the paws of an intruding pet, which cover a very limited area of contact, the top layer 14 must be sufficiently strong to adhere to them when the pet steps on it. On the other hand, the bottom layer 16 presses against the entire area of contact with the underlying supporting surface, and thus requires less adhesive strength for adhesion and stability. It is found that the pressure sensitive adhesive sold by Catalina Pressure Sensitives Company of Sun Valley, Calif., as Product No. AWB322 is suitable for the requirements of the bottom layer 16, while the product sold by Catalina Plastic and Coating Corporation of Calabasas, Calif., as Part No. P2067 is suitable for the top layer 14. These layers are formed by coating the sheet 12 either by rolling or spraying the adhesives over its opposite surfaces. A layer of non-sticky material may also be adhered to one side of the sheet material 10 as a protective backing.

According to the best mode of practicing the invention, the coated sheet material 10 is manufactured in a roll 20 for ease of storage and transportation. As in the case of carpets and other large-surface flexible material, the use of rolls makes it possible to have wide surfaces available for custom fitting the geometry of the area to be protected. An intermediate layer of non-sticky backing material 18 can be incorporated into the roll to avoid bonding between the adhesive surfaces. Given the pressure-sensitive nature of the layers of adhesive coating the top and bottom of the flexible sheet 12, the two layers are then easily separated by peeling off the intermediate backing material shown at the outside fold of the roll, in much the same way that regular double-sided tape is peeled off its roll. Thus, in operation, the double-sided adhesive material of the invention is peeled off the roll 20 and cut to conform to the area for which it is intended. The material is then laid down with its bottom layer 16 facing the supporting surface, to which it will stick to form a forbidden area of intrusion for the target animal. If the materials constituting the sheet 12 and the adhesive layers 14 and 16 are transparent, the apparatus of the invention will blend into the background of its surroundings and be almost invisible to an observer. Thus, when the animal first steps on it accidentally, it will cause the intended discomfort and reaction, which the animal will associate not only with the sticky surface but also with the specific location where it is placed. Soon the animal will avoid that location and it is found that the behavior continues even after the repelling apparatus is removed. Therefore, the invention is effective both for the immediate result of forcing the animal to stay away from a given area and for long-term training to achieve the same result even without its use.

Figure 3:
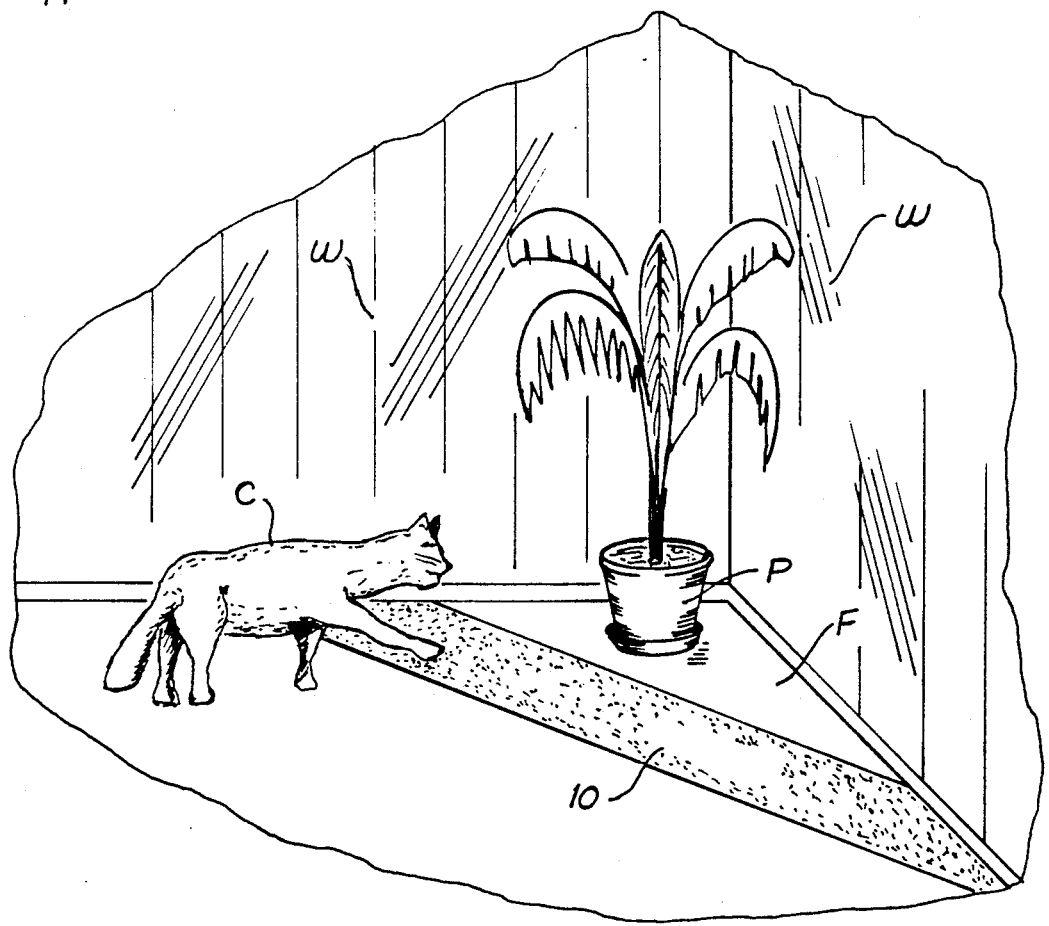
FIG. 3 is a perspective view illustrating the use of the invention in a typical household setting.

FIG. 3 is an illustration of how the sheet material 10 of the invention might be used to keep a cat C away from a plant P placed on the floor F in a corner of a room between two walls W. The material 10 is shown as not transparent in order to better illustrate its placement on the floor. The sheet material is cut to the right size to cover an area going from wall to wall, corresponding to the boundary of the prohibited area and wide enough that the cat would not be likely to accidentally miss it in approaching the plant. For example, a width of approximately 12 inches is sufficient to deter average size house cats. The backing 18 is peeled off, and the material is then placed down firmly with the adhesive bottom layer 16 facing the floor downward, so that it adheres in place with the adhesive top layer 14 facing up, so that it is exposed to the cat. As the cat steps on it, the top adhesive layer 14 sticks to his paws, causing him great irritation that forces him away.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What I claim is:

1. A method for repelling and training a ground animal to stay away from a selected area, comprising the following steps:
   (1) providing a sheet material with a first layer of pressure sensitive adhesive covering the top surface and a second layer of pressure sensitive adhesive covering the bottom surface thereof, said sheet material further having a non-sticky backing material adhered to said second layer of pressure sensitive adhesive;
   (2) cutting said sheet material to conform to the shape of the boundary of the selected area and peeling off said non-sticky backing material; and
   (3) attaching the sheet material to a supporting surface at the boundary of the selected area with said second layer facing down and adhering to the supporting surface, and with said first layer facing up, so as to cause irritation and discomfort to an animal stepping on it.

2. The method described in claim 1, wherein said sheet material is flexible.

3. The method described in claim 1, wherein said sheet material is transparent.

4. The method described in claim 1, wherein said sheet material is flexible and transparent.

5. The method described in claim 1, wherein said sheet material is made with vinyl plastic.

6. The method described in claim 5, wherein said vinyl plastic is flexible and transparent.

7. The method described in claim 1, wherein said first layer of pressure sensitive adhesive covering the top surface of said sheet material is stronger than said second layer of pressure sensitive adhesive covering the bottom surface of said sheet material.

8. The method described in claim 7, wherein said sheet material consists of flexible and transparent vinyl plastic.

9. The method described in claim 1, wherein said sheet material is made available in a roll.

* * * * *